United States Patent Office 2,772,169
Patented Nov. 27, 1956

2,772,169

ANTIOXIDANT MATERIAL AND USE OF SAID MATERIAL IN TREATING MEAT

Lloyd A. Hall, Chicago, Ill., assignor to The Griffith Laboratories, Inc., a corporation of Illinois No Drawing. Application January 6, 1956,
Serial No. 557,649

10 Claims. (Cl. 99—159)

This invention relates to non-toxic antioxidant material and the use of said material in treating meat to render it more appealing to consumer requirements.

The term "antioxidant material" sometimes refers to effective, non-toxic amounts of ascorbic acid as well as suitable non-toxic antioxidant compositions which contain ascorbic acid as one of the effective ingredients This application is a continuation-in-part of my copending application Serial No. 380,106, filed September 14, 1953, which was, in turn, a continuation-in-part of my copending application Serial No. 175,015, filed July 20, 1950, now abandoned, which was, in turn, a continuation-in-part of the then copending application Serial No. 27,835, filed May 18, 1948, now abandoned.

In the curing of meat in the presence of a nitrite salt, the hemoglobin and myoglobin present in the lean portions of the meat are transformed to nitrosohemoglobin and nitrosohemochromogen, and to nitrosomyoglobin and nitrosomycohromogen, respectively. It is this cure which produces the desirable red color in cured meat such as bacon and sausage. The nitrite is present in order to supply nitric oxide required in the formation of the nitroso compounds. If too much nitrite is present or if conditions are not proper, the nitrite can act as an oxidizing agent to destroy the red color. In most meat, however, a balanced curing agent in and of itself will produce a properly colored meat during the cure.

In recent years the pre-slicing and pre-packaging of cured meats has become a fixed marketing practice. Because of the resulting increased exposure of the meat to light and air, there is today a markedly increased tendency for meat to become gray or lose its red color prior to sale or consumption. While this apparently does the meat no harm, the product loses its consumer appeal and the customer frequently believes that the product has been spoiled.

The change which occurs when the desirable red color is lost is not a simple oxidation phenomenon, and ordinary antioxidants have little or no effect upon it.

I have found that the addition of an ascorbic acid—either the l- or d-ascorbic acid—to meat either prior to, during, or after the curing process is of benefit in producing and retaining the desired red color for the lean portions thereof. If desired, ascorbic acid may be used in combination with other suitable antioxidants.

In my application Serial No. 27,835, I indicated the addition of ascorbic acid as the best antioxidant for the protection of sausage and bacon. For example, at the top of page 8 of said application, it is indicated that the use of ascorbic acid results in the highest A. O. M. figure for any of the antioxidants disclosed, thus indicating that ascorbic acid is the most effective antioxidant disclosed. Reference to "bacon" in said application referred to bacon treated to effect its cure, that is, bacon containing nitrate salts and/or nitrite salts, which is in conformance with accepted use of the term "bacon" in the art. In the case of sausage, which is disclosed in said application, it is absolutely necessary that ascorbic acid is present during curing with nitrate and/or nitrite salts because the sausage is enclosed in a casing before curing and, therefore, the only way that the ascorbic acid can be introduced is to put it in before the meat is stuffed into the casing, and thus before curing occurs.

My invention contemplates the use of suitable ingredients which tend to render ascorbic acid more soluble and/or more effective and which may be used, if desired, in conjunction with ascorbic acid. For example, phospholipoid (such as lecithin), gallic esters, edible oils, and the like, as wel as suitable admixtures thereof, may be used in combination with ascorbic acid.

The phospholipoid, such as lecithin, that is used in the present invention serves to make the ascorbic acid soluble in fats and also solubilizes the gallic ester. It also aids in reducing the amounts of antioxidant normally extracted by water, particularly hot water. The use of a phospholipoid carrier or solubilizer for gallic ester antioxidants has been described and claimed in my copending application Serial No. 606,283, filed July 20, 1945 and issued March 22, 1949, as Patent No. 2,464,928.

The gallic esters that may be used are preferably methyl gallate, ethyl gallate, propyl gallate, butyl gallate, lauryl gallate, hexy gallate and combinations thereof. The oil that is used may be any edible oil, such as a vegetable oil or lard oil. The preferred oil is corn oil, wheat germ oil, or other oils containing tocopherols as the tocopherols also have an antioxidant action. If desired a tocopherol concentrate such as a distilled concentrate of mixed tocopherols may also be added. The oils that may be used include corn oil, cottonseed oil, wheat germ oil, the various hydogenated oils, lard oils, and mixtures of these or other oils.

The antioxidant compositions of this invention must be free from moisture. They may be used either in regular strength or concentrated form. The preferred proportions for both regular and concentrated strengths are as follows:

Table I

| | Percent |
|---|---|
| Gallic ester | 1.5 to 7.5 |
| Ascorbic acid | 1.5 to 7.0 |
| Phospholipoid | 12.0 to 40.0 |
| Edible oil | 85.0 to 42.5 |

The commercial regular antioxidant is preferably within the following ranges:

Table II

| | Percent |
|---|---|
| Gallic ester | 1.5 to 6.0 |
| Ascorbic acid | 1.5 to 3.0 |
| Phospholipoid | 12.0 to 25.0 |
| Edible oil | 85.0 to 66.0 |

The commercial concentrated antioxidant is preferably within the following ranges:

Table III

| | Percent |
|---|---|
| Gallic ester | 6.0 to 7.5 |
| Ascorbic acid | 3.0 to 7.0 |
| Phospholipoid | 25.0 to 40.0 |
| Edible oil | 66.0 to 45.0 |

As will be noted, the upper limits of the preferred commercial regular antioxidants are the same as the lower limits of the commercial concentrated antioxidants. If a particular antioxidant composition falls in this region, it may be classed as either regular or concentrated. The gallic ester and edible oil ingredients in the tables are intended to refer to the above-mentioned esters and oils.

If desired, a suitable antioxidant may be prepared by introducing 534 lbs. of refined corn oil introduced into a tank equipped with adequate agitation means. The oil is warmed to a temperature of 185° F. and 340 lbs. of lecithin are added. The mixture is agitated for ten minutes and 60 lbs. of anhydrous ascorbic acid are added. The agitation is continued for about one-half hour with the temperature being maintained between about 175–185° F. At the end of this period, 66 lbs. of propyl gallate are added and the agitation continued for one and one-half hours while the mixture is maintained within the above temperature range. At the end of this period, the batch is cooled as rapidly as possible to a temperature of at least 100° F. This cooling period should not require more than about one hour so as to prevent break down of the composition into a jelly layer and a clear upper oil layer.

In my application Serial No. 27,835, the preferred amount of antioxidant acid, that is, ascorbic acid, fell in the range of 1.5% to 7.0% by weight of the entire antioxidant composition. Effective results were obtained when the amount of the composition used was somewhere from about 0.01% to 0.175% by weight of the material to which the composition was added.

An ascorbic acid, as used herein, includes the two optical isomers and their edible salts, such as the sodium salts.

The foregoing detailed description has been given for clearness of understanding only, and no unnecessary limitations should be understood therefrom, as modifications will be obvious to those skilled in the art.

I claim:

1. In the curing of meat, the step of adding, in the presence of nitrite salts, an effective amount of an antioxidant composition comprising 1.5 to 7.5 parts by weight of a gallic ester, 1.5 to 7 parts by weight of ascorbic acid, and 12 to 40 parts by weight of phospholipoid.

2. In the curing of meat, the step of adding, in the presence of nitrite salts, an effective amount of an antioxidant composition comprising 1.5 to 7.5 parts by weight of a gallic ester, 1.5 to 7 parts by weight of ascorbic acid, 12 to 40 parts by weight of phospholipoid, and 85 to 42.5 parts by weight of edible oil.

3. In the curing of meat, the step of adding, in the presence of nitrite salts, an effective amount of an antioxidant composition comprising 6 to 7.5 parts by weight of a gallic ester, 3 to 7 parts by weight of ascorbic acid, 25 to 40 parts by weight of phospholipoid, and 66 to 45 parts by weight of edible oil.

4. In the curing of meat, in the step of adding, in the presence of nitrite salts, at least about 0.01% by weight, based on the weight of meat, of an antioxidant composition comprising 1.5 to 7.5 parts by weight of a gallic ester, 1.5 to 7 parts by weight of ascorbic acid, and 12 to 40 parts by weight of phospholipoid.

5. In the curing of bacon, the step of adding an effective amount of an antioxidant composition comprising 1.5 to 7.5 parts by weight of a gallic ester, 1.5 to 7 parts by weight of ascorbic acid, and 12 to 40 parts by weight of phospholipoid.

6. In the curing of meat, the step of adding, in the presence of nitrite salts, an effective amount of an antioxidant composition comprising 1.5 to 6 parts by weight of a gallic ester, 1.5 to 3 parts by weight of ascorbic acid, 12 to 25 parts by weight of phospholipoid, and 85 to 66 parts by weight of edible oil.

7. An antioxidant composition comprising: 1.5 to 7.5 parts by weight of a gallic ester; 1.5 to 7 parts by weight of ascorbic acid; and 12 to 40 parts by weight of phospholipoid.

8. An antioxidant composition comprising: 1.5 to 7.5 parts by weight of a gallic ester; 1.5 to 7 parts by weight of ascorbic acid; 12 to 40 parts by weight of phospholipoid; and 85 to 42.5 parts by weight of edible oil.

9. An antioxidant composition comprising: 1.5 to 6 parts by weight of a gallic ester; 1.5 to 3 parts by weight of ascorbic acid; 12 to 25 parts by weight of phospholipoid; and 85 to 66 parts by weight of edible oil.

10. An antioxidant composition comprising: 6 to 7.5 parts by weight of a gallic ester; 3 to 7 parts by weight of ascorbic acid; 25 to 40 parts by weight of phospholipoid; and 66 to 45 parts by weight of edible oil.

References Cited in the file of this patent
UNITED STATES PATENTS

| | | |
|---|---|---|
| 2,464,928 | Hall | Mar. 22, 1949 |
| 2,553,533 | Komarik et al. | May 15, 1951 |
| 2,707,154 | Lehmann et al. | Apr. 26, 1955 |

OTHER REFERENCES

"Food Technology," October 1949, pages 332 to 336, inclusive, articles entitled "Antioxidants in the Hemoglobin Catalyzed Oxidation of Unsaturated Fats."

"Food Technology," May 1952, pages 194 to 196, inclusive, article entitled "Ascorbic Acid and Meat Color."